United States Patent [19]
Nossen

[11] 4,412,302
[45] Oct. 25, 1983

[54] DIGITAL PHASE DEMODULATION AND CORRELATION

[75] Inventor: Edward J. Nossen, Cherry Hill, N.J.

[73] Assignee: RCA Corporation, New York, N.Y.

[21] Appl. No.: 216,167

[22] Filed: Dec. 15, 1980

[51] Int. Cl.³ .............................................. G06F 15/34
[52] U.S. Cl. .................................... 364/728; 329/112
[58] Field of Search ............... 364/728, 724, 604, 819; 328/133; 329/112

[56] References Cited

U.S. PATENT DOCUMENTS

| | | | |
|---|---|---|---|
| 3,598,979 | 8/1971 | Moreau | 364/728 |
| 3,670,151 | 6/1972 | Lindsay et al. | 364/728 |
| 3,812,493 | 5/1974 | Afendykiw et al. | 343/12 R |
| 3,819,919 | 6/1974 | McGunigle | 364/510 |
| 3,831,013 | 8/1974 | Alsup et al. | 364/728 |
| 3,955,197 | 5/1976 | Gutleber et al. | 343/17.2 PC |
| 3,956,623 | 5/1976 | Clark et al. | 364/729 |
| 4,025,775 | 5/1977 | Beauvais et al. | 364/604 |
| 4,112,358 | 9/1978 | Ashida | 324/78 D |
| 4,112,497 | 9/1978 | Layland et al. | 364/728 |
| 4,168,529 | 9/1979 | Tomlinson | 364/728 |
| 4,181,967 | 1/1980 | Nash | 364/724 |

*Primary Examiner*—David H. Malzahn
*Attorney, Agent, or Firm*—Samuel Cohen; Joseph S. Tripoli; Donald W. Phillion

[57] ABSTRACT

A system for digitally detecting the energy content of a received analog signal of frequency $f_c$. The system comprises signal means for generating sampling pulses of repetition rate 4 $f_c$, a first two level signal of frequency 2 $f_c$, whose successive level transitions occur near successive sampling pulses, a second two level signal whose successive level transitions occur near successive level transition of a first polarity of said first two level signal, and first and second interleaved trains of clock pulses each having a repetition rate 2 $f_c$, and with each clock pulse occurring between the level transitions of successive half cycles of said first two level signal. Also provided are signal means responsive to said sampling pulses to obtain alternate I and Q samplings of said analog signal with each sampling comprising a magnitude component and a sign component. A multiplying means multiplies the sign component of each sampling by said second two level signal to produce a corrected sign signal. First and second accumulating means are each responsive to said corrected sign signal and are respectively responsive to said first and said second trains of pulses to accumulate, respectively, said I and Q samplings with a sign bit whose polarity is in accordance with said corrected sign signal.

12 Claims, 6 Drawing Figures

DIGITAL PHASE DEMODULATION AND CORRELATION

This invention relates generally to digital processing of encoded analog signals and more particularly to the demodulation of encoded signals by digital means.

In the past few decades, various means and methods for demodulating encoded analog signals by digital means, as opposed to analog means, have been developed. Some of these prior art methods employ the concept of sampling the analog signal at a rate equal to twice the frequency of the expected received analog signal. Such a technique is particularly useful in instances where a plurality of received signals are expected, each having a different frequency. The sampling of the received spectrum of signals at twice the frequency of the signal desired to be selected therefrom results in the identification of such expected signal by the absolute magnitude of the accumulated samples. Such a technique is essentially an energy detecting technique. One particular such prior art means digitally samples a received analog signal four times for each cycle of the carrier frequency or the intermediate frequency thereof, (twice for the in-phase (I) component and twice for the quadrature phase (Q) components) in accordance with Nyguist's Theorem. The use of I and Q sampling signals is necessary since a single sampling might occur at a zero crossing of the received signal thereby producing a zero amplitude sampling which would be virtually meaningless considered by itself. In such a case, the Q sampling would occur at the maximum value of the received signal, thereby compensating for the misleading zero amplitude sampling.

The four digitized samplings for each carrier, or intermediate frequency (IF) cycle are accumulated separately in four accumulators. At periodic intervals, the four accumulated samplings are read from the four accumulators, along with their polarity signs, and interpreted by appropriate logic means. In some applications, the Q samplings can be employed to alter the phase of the I and Q samplings with respect to the received carrier or intermediate frequency so that the Q samplings will become zero, thereby synchronizing the I sampling signal with the maximum occurrences of the received carrier signal or IF signal.

The present invention marks a definite improvement in the art by reducing, from four to two, the number of accumulators required to accomplish the function described above.

In accordance with a preferred form of the invention there is provided a timing source means for generating sampling pulses having a repetition rate of $4f_c$ where $f_c$ is a frequency of the received analog signal to be demodulated, a first two-level signal of frequency $2f_c$ whose successive level transitions occur near or at the occurrence of successive sampling pulses, and a second two-level polarity control signal of frequency $f_c$ whose successive level transitions occur during successive level transitions of a first polarity only, of said first two-level signal. Also provided are means responsive to said sampling pulses to obtain alternate I and Q digital samplings of said analog signal with each signal comprising a magnitude component and a sign (polarity) component, and means for multiplying said sign component signal by said second two level signal to produce a corrected sign component signal. Logic means responsive to said sampling pulses and said first two-level signal generate first and second interleaved trains of pulses each having a repetition rate $2f_c$ and each occurring between the level transitions of successive half cycles of said polarity control signal of frequency $f_c$. First and second accumulator means are respectively responsive to said first and second interleaved trains of pulses to accumulate said I and Q samplings respectively. Further provided are means for combining the absolute magnitudes of the accumulations in said first and second accumulators. Further provided are means for combining and interpreting the absolute magnitude of the accumulations of said first and second accumulators.

The logic diagram of FIG. 1 will now be discussed with the aid of the waveforms of FIG. 2. For purposes of convenience, the waveforms of FIG. 2 will be identified as waveform 2A, waveform 2B, etc.—rather than as waveform A of FIG. 2 or waveform B of FIG. 2. Further, the appearance of the each of the waveforms of FIG. 2 in the logic diagram of FIG. 1 will be identified by encircled legends such as (2A) or (2B). Thus, the encircled legend (2A) in FIG. 1 appearing at the output of the IF stage 10 indicates that the signal represented by the waveform 2A appears at the output of IF stage 10.

Figure 1:
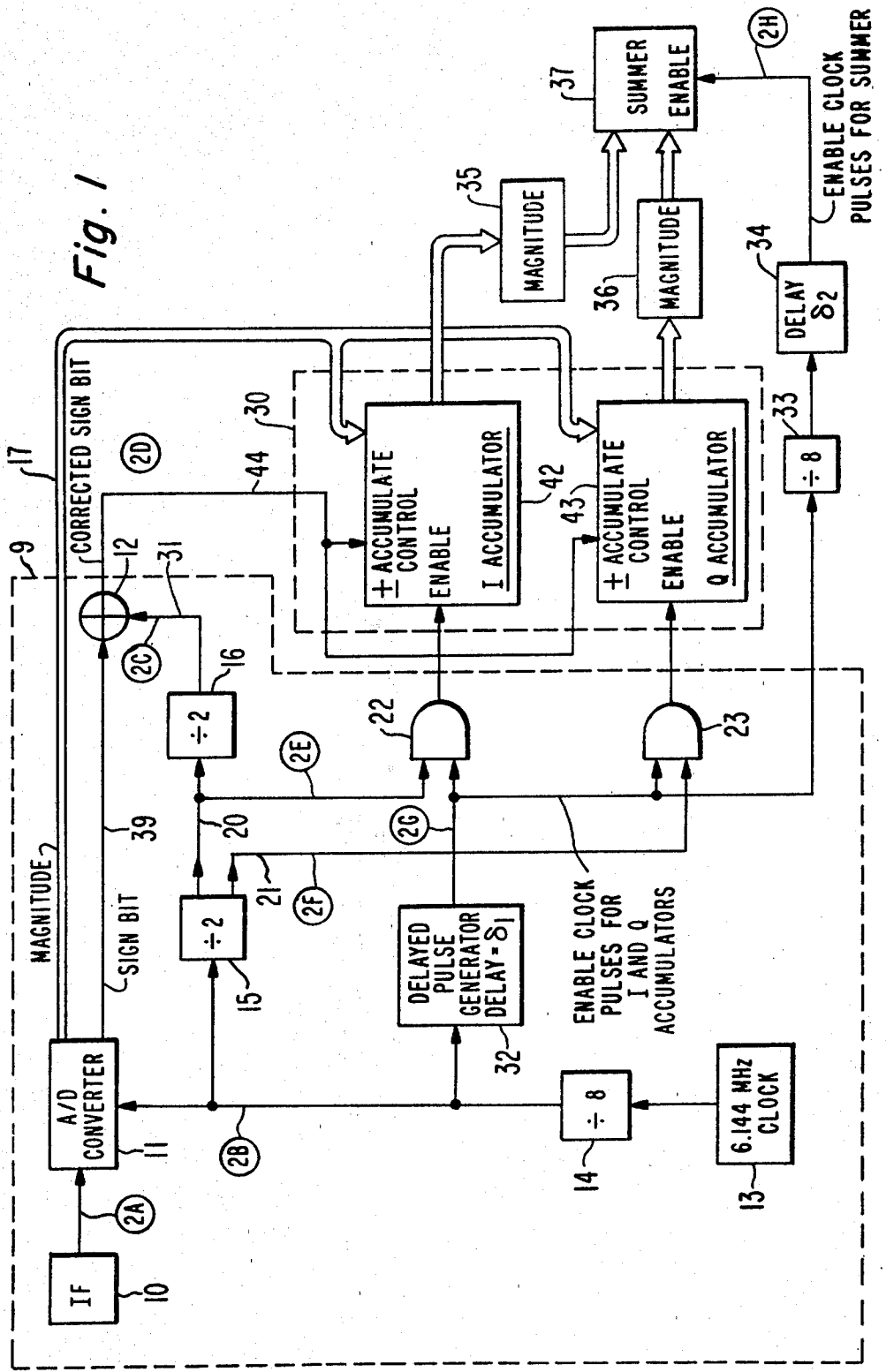
FIG. 1 is a block diagram of one form of the invention.

The purpose of the structure of FIG. 1 is to determine the energy content of the output signal of IF stage 10. Such output signal, represented by waveform 2A and having a frequency $f_c$ is supplied to the analog-to-digital (A/D) converter 11. Also supplied to A/D converter 11 is a 768 KHz train of sampling pulses derived through divide by 8 divider 14 from 6.144 MHz clock signal source 13. The 768 KHz train of sampling pulses shown in waveform 2B has a repetition rate exactly four times that of the 192 KHz output signal supplied from IF stage 10. Thus, each cycle of the signal of waveform 2A will be sampled four times, with two of the samples being designated as I samples and two of the samples being designated as Q samples. Specifically, for example, during the first cycle of the signal of waveform 2A occurring between times $t_0$ and $t_6$ of waveform 2A the I signals, designated as $I_1$ and $I_2$, occur at times $t_1$ and $t_4$ and the two Q signals, designated as $Q_1$ and $Q_2$, occur at times $t_2$ and $t_5$. The spacing between successive I and Q signals is 90°, as indicated between the time $t_1$ and $t_2$ and the times $t_2$ and $t_4$. Since the phase relationship between the I and Q signals and the sine shaped signal of waveform 2A is not known, at least at the beginning of operation of a system, the I and Q signals will, in all probability not occur at either the zero crossover or the maximum values of the signal of waveform 2A. Thus the $I_1$ signal can, for example, be removed from the zero crossover point by $\Delta\Phi_2$ phase angle, as shown between times $t_6$ and $t_7$. The Q signal, as represented by $Q_1$, would then be removed from the zero crossover point of waveform 2A by phase angle $\Delta\Phi_1$, as indicated between times $t_2$ and $t_3$.

However, as is well known in the art, regardless of the phase relationship of the I and the Q sampling signals with respect to waveform 2A the square root of the sum of the squares of the values of I and Q for each half cycle of waveform 2A will equal the average maximum value of said each half cycle of waveform 2A. Thus, $\sqrt{I_1{}^2+Q_1{}^2}$ is equal to the maximum value of waveform 2A.

Figure 2:
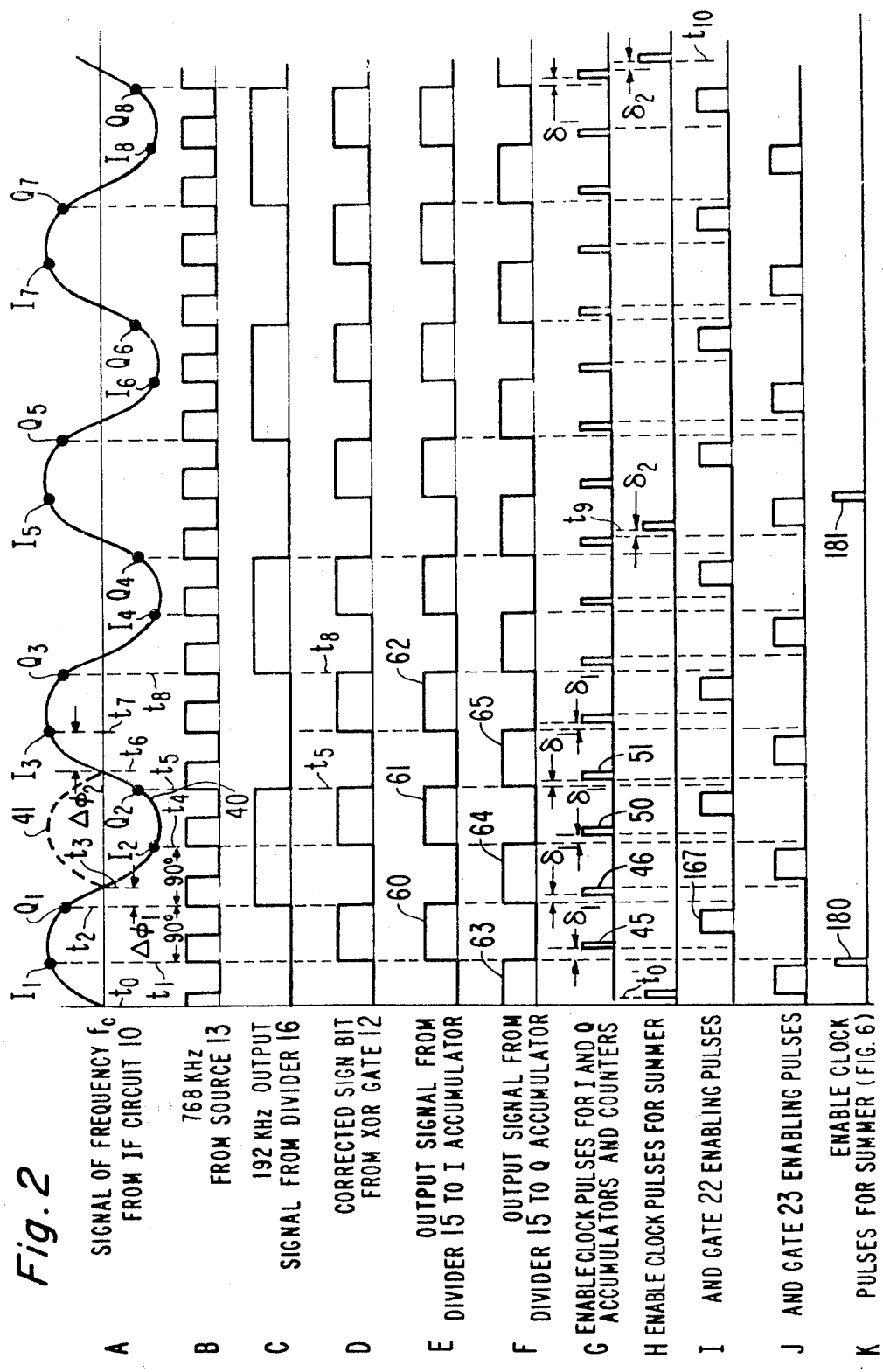
FIG. 2 is a set of waveforms to facilitate an understanding of the block diagram of FIG. 1.

It will be seen that four complete cycles of the signal of waveform 2A are shown in FIG. 2 with each cycle having two I samplings and two Q samplings which are designated as $I_1$ through $I_8$ and $Q_1$ through $Q_8$, and with the I and Q samplings of the last three cycles occurring at substantially the same time in their cycles of waveform 2A as $I_1$, $I_2$, $Q_1$, and $Q_2$ occur in the first cycle of waveform 2A. Without discussing in detail the means therefor it is understood that in some applications it is desired to have the Q samples occur at zero crossover points so that the I sample will occur at maximum value of the half cycles of waveform 2A. In such applications, it is apparent that the positions of the I and Q samplings with respect to the zero crossover points of waveform 2A must change with time until the Q samplings coincide with the zero crossover points of waveform 2A. Logic for causing the Q samplings to occur at the zero crossover points will be discussed later herein re FIG. 3. It is to be noted that the sampling pulses of waveform 2A occur on the positive-going leading edge of each cycle of the 768 KHz waveform of waveform 2B.

The A/D converter 11 functions to supply the magnitude component of the digitzed I and Q signals generated therein onto output bus 17 and the sign bit of each of the said magnitude components onto output terminal 39.

It is apparent from waveform 2A that both the I samplings and the Q samplings are alternately positive and negative. For example, both $I_1$ and $Q_1$ are positive samplings and $I_2$ and $Q_2$ are negative samplings. Such I and Q samplings are stored in accumulators 42 and 43 under control of appropriate enabling pulses supplied to said accumulators 42 and 43 from AND gates 22 and 23, respectively, by timing logic which will be described in more detail later herein. The polarity of the samplings supplied to accumulators 42 and 43, which polarity indicates whether the samplings should be added to or subtracted from the accumulation stored in said accumulators, is determined by the polarity sign bit present on the accumulator control lead 44 which carries the sign bit to both accumulators 42 and 43.

Since the polarity of consecutive samplings, such as samplings $I_1$ and $I_2$ or $Q_1$ and $Q_2$ occurring on successive half cycles of the waveform of FIG. 2A, are alternately positive and negative, any given sampling will substantially cancel the immediately preceeding one. Accordingly, means must be provided to change the polarities of the two samplings $I_2$ and $Q_2$ from negative to positive or, alternatively, the samplings $I_1$ and $Q_1$ from positive to negative. Which change in polarity is selected is of no consequence since ultimately the absolute magnitudes of the I signals and the Q signals will be determined for use in appropriate utilization circuits.

Such change of polarity is effected by Exclusive OR (XOR) gate 12, to one input of which the sign bit from A/D converter 11 is supplied and to the other input of which the 192 KHz output signal (waveform 2C) from divider 16 is supplied. The waveform 2C is generated by means of the 6.144 MHz clock source 13 divided by divide-by-8 divider 14, divide-by-2 divider 15 and divide-by2 divider 16. It will be noted that the level transitions of waveform 2C occur at positive-going transitions of the 768 MHz waveform 2B, thus guaranteeing that the level transitions of waveform 2C will occur at either the I or Q sampling times shown in waveform 2A. In the specific example of FIG. 2 it can be seen that the transitions of waveform 2C occur on the Q samplings. Assume, for discussion purposes, that from a previous Q sampling the output signal of divider 16 (waveform 2C) at time $t_0$ is at its low level. Then at time $t_1$ the positive $I_1$ sampling is taken with a positive sign bit. The XOR gate 12 responds to the positive sign bit of the $I_1$ sampling and the low level output signal of waveform 2C at time $t_1$ to supply a corrected sign bit of positive polarity to its output terminal 44. Such corrected sign bit is indicated by the encircled legend 2D on lead 44 of FIG. 1. The magnitude component of the $I_1$ sampling appearing on bus 17 is supplied to the I accumulator 42 by an enable clock pulse 45 of waveform 2G which is supplied from AND gate 22 and which occurs a time interval $\delta_1$-, after the occurrence of the $I_1$ sampling, thereby providing settling time for the A/D converter 11, XOR gate 12, and the divider 16 after the $I_1$ sampling.

At time $t_2$ the $Q_1$ sampling occurs, as shown in waveform 2A, as a result of positive-going leading edge of waveform 2B. At the same time $t_2$ the output of divider 16 goes from its low to its high level, as shown in waveform 2C. The XOR gate 12 responds to the positive $Q_1$ sampling and the positive high level output signal from divider 16 to produce a low level corrected sign bit at the output thereof as shown in waveform 2D at time $t_2$. A short time later, an enabling pulse 46, shown in waveform 2G, is supplied from AND gate 23 by logic to be described later herein to enter the $Q_1$ sampling magnitude value into accumulator 43 via bus 17 with a negative sign bit.

Next, at time $t_4$, the negative $I_2$ sampling is taken with a negative sign bit. XOR gate 12 responds to the negative sign bit of the $I_2$ sampling and the positive output of divider 16 to output a positive sign bit to the I accumulator 42 via lead 44. Thus, the $I_2$ magnitude is stored in accumulator 42 as a positive quantity as was the $I_1$ magnitude time at $t_1$. In a similar manner all of the subsequent I values, namely $I_3$, $I_4$, $I_5$, $I_6$, $I_7$, and $I_8$ will be entered into accumulator 42 as positive values since all of the negative I samplings will be inverted to a positive value by means of the XOR gate 12 and the output of divider 16.

In a similar manner, all of the Q samplings will have the same polarity which, in the instant example, will be negative. More specifically, at time $t_5$ when the output of divider 16 goes negative XOR gate 12 will respond to such negative level and the negative sampling $Q_2$ to produce a negative sign bit. The absolute magnitude of the value $Q_2$ will appear on output bus 17 of A/D converter 11.

Thus, the polarity of the $Q_2$ sampling will be the same as that of the $Q_1$ sampling, both being negative. In a similar manner, the polarities of the $Q_3$, $Q_4$, $Q_5$, $Q_6$, $Q_7$, and $Q_8$ will all be negative.

The corrected sign bit of the $Q_3$ sampling, as mentioned above, is a negative value beginning at time $t_5$ in waveform 2D and extending until time $t_7$ when the $I_3$ sampling occurs, which is positive as shown in waveform 2A. XOR gate 12 responds to the positive sign bit of sampling $I_3$ and the negative output from divider 16 to produce a positive corrected sign bit, as shown at time $t_7$ of waveform 2D.

The enabling clock pulses 50 and 51 of waveform 2G each occurs a time interval $\delta_1$ after the $I_2$ and $Q_2$ samplings respectively. The time interval $\delta_1$ permits the various logic circuits to settle before the magnitude outputs of A/D converter 11 are entered into the I and Q accumulators 42 and 43 under control of the corrected sign bit from XOR gate 12.

The alternate enabling of accumulators 42 and 43 with successive samplings occurs as follows. The Q and $\overline{Q}$ outputs of divide-by-2 divider 15 are supplied respectively to AND gates 22 and 23 with the Q output also being supplied to divide-by-2 divider 16 via lead 20, which responds thereto to produce the waveform 2C as discussed above. The signals appearing at the Q and $\overline{Q}$ output terminals of divider 15 are shown respectively in waveforms 2E and 2F of FIG. 2, and can be seen to be the inverse of each other due to the fact that the two AND gates 22 and 23 are alternately primed. Specifically, AND gate 22 is primed during the high level portions 60, 61, and 62 of waveform 2E and AND gate 23 is primed during the high level portions 63, 64, 65 of waveform 2F. The enabling pulses of waveform 2G, such as pulses 45, 46, 50, and 51, are generated in delayed pulse generator 32 in response to the output of divide-by-8 divider 14 and are supplied to second inputs of both AND gates 22 and 23 and also to divide-by-8 divider 33, which will be discussed later herein.

Since the two AND gates 22 and 23 are alternately primed by the waveforms 2E and 2F the enabling pulses of waveform 2G will pass through AND gates 22 and 23 in an alternate manner when such AND gates 22 and 23 are primed. Thus, the accumulators 42 and 43 will be enabled alternately by the enabling clock pulses of waveform 2G to enter into said accumulators 42 and 43 the magnitude outputs from A/D converter 11 under control of the corrected sign bit of waveform 2D appearing on lead 44.

In some applications, it is desirable to read-out the total of a given number of magnitude accumulated. The foregoing can be accomplished by the enabling clock pulses shown in waveform 2H which function to enable summer 37 to add together the absolute magnitudes of the accumulated totals in accumulators 42 and 43 by means of magnitude determining logic means 35 and 36. The enabling clock pulses of waveform 2H are generated by divide-by-8 divider 33; and delay means 34 which function to divide the output of delayed pulse generator 32 by 8 and to then delay such divided pulses a delay time $\delta_2$, as indicated in waveform 2H. In most applications, divider 33 will divide by a number much larger than 8. The latter is used for illustration purposes.

Figure 3:
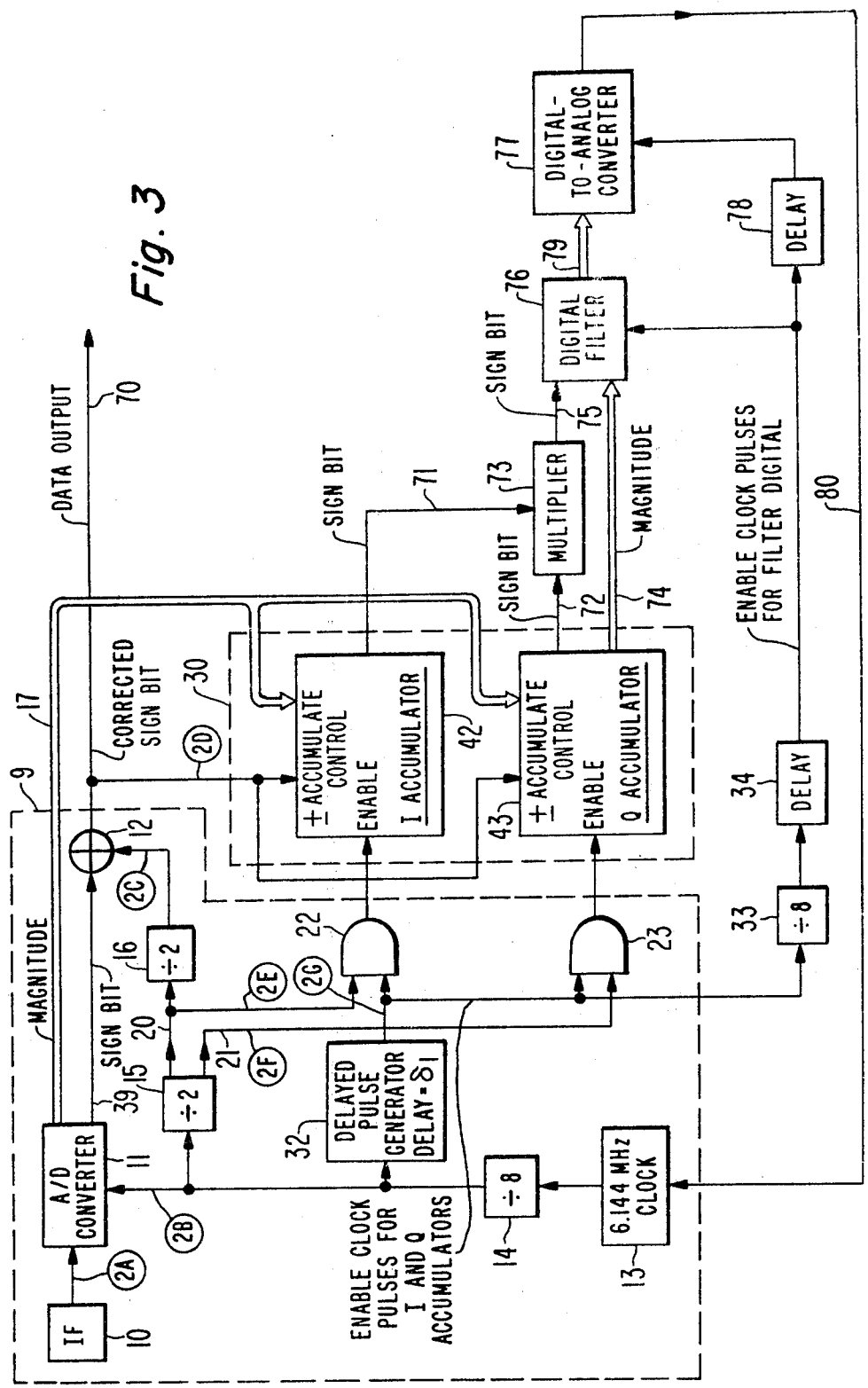
FIG. 3 is a block diagram of another form of the invention directed to biphase demodulation.
Figure 4:
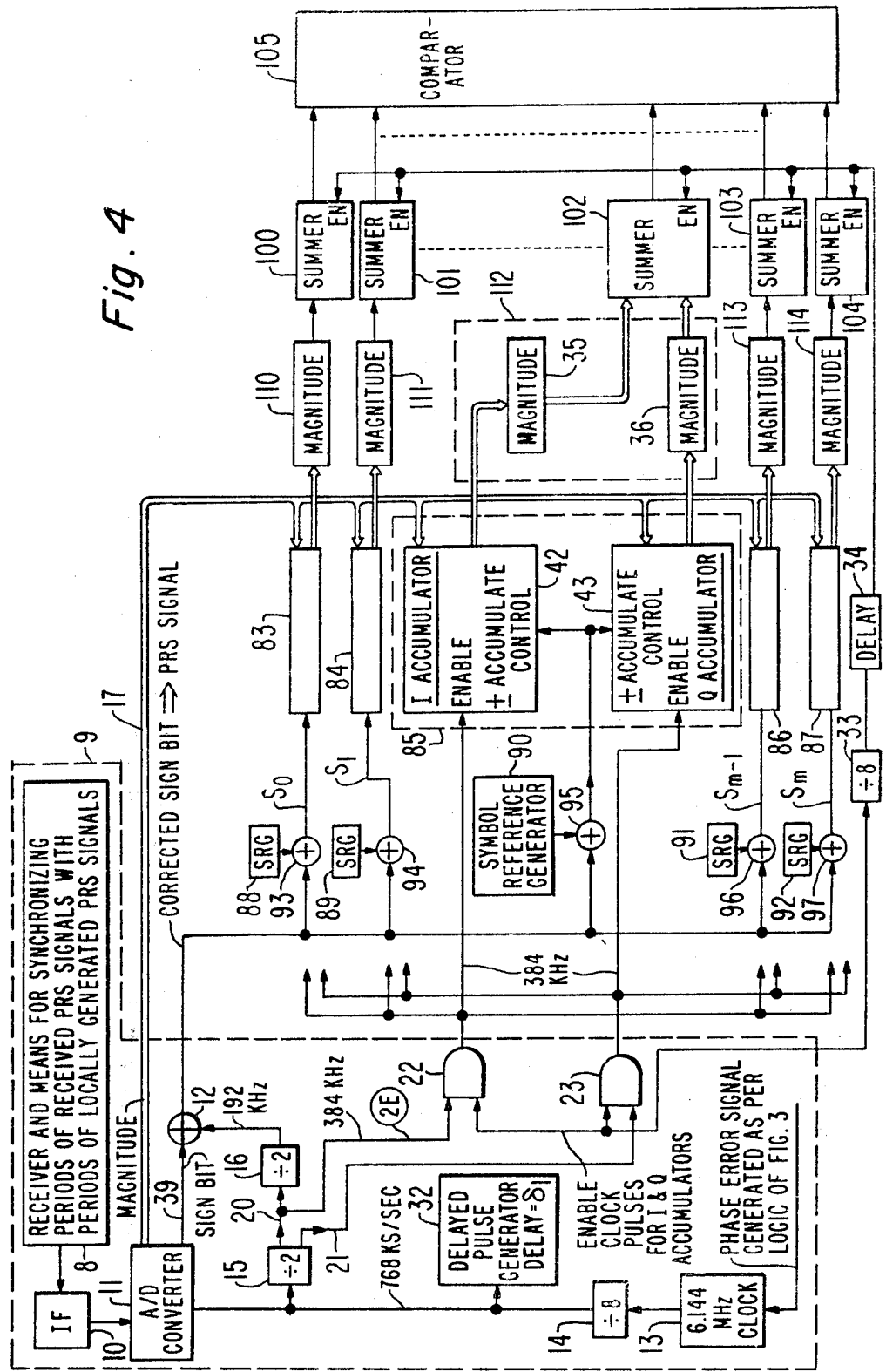
FIG. 4 is a block diagram of yet another form of the invention for receiving and demodulating a plurality of signals of different frequencies.
Figure 5:
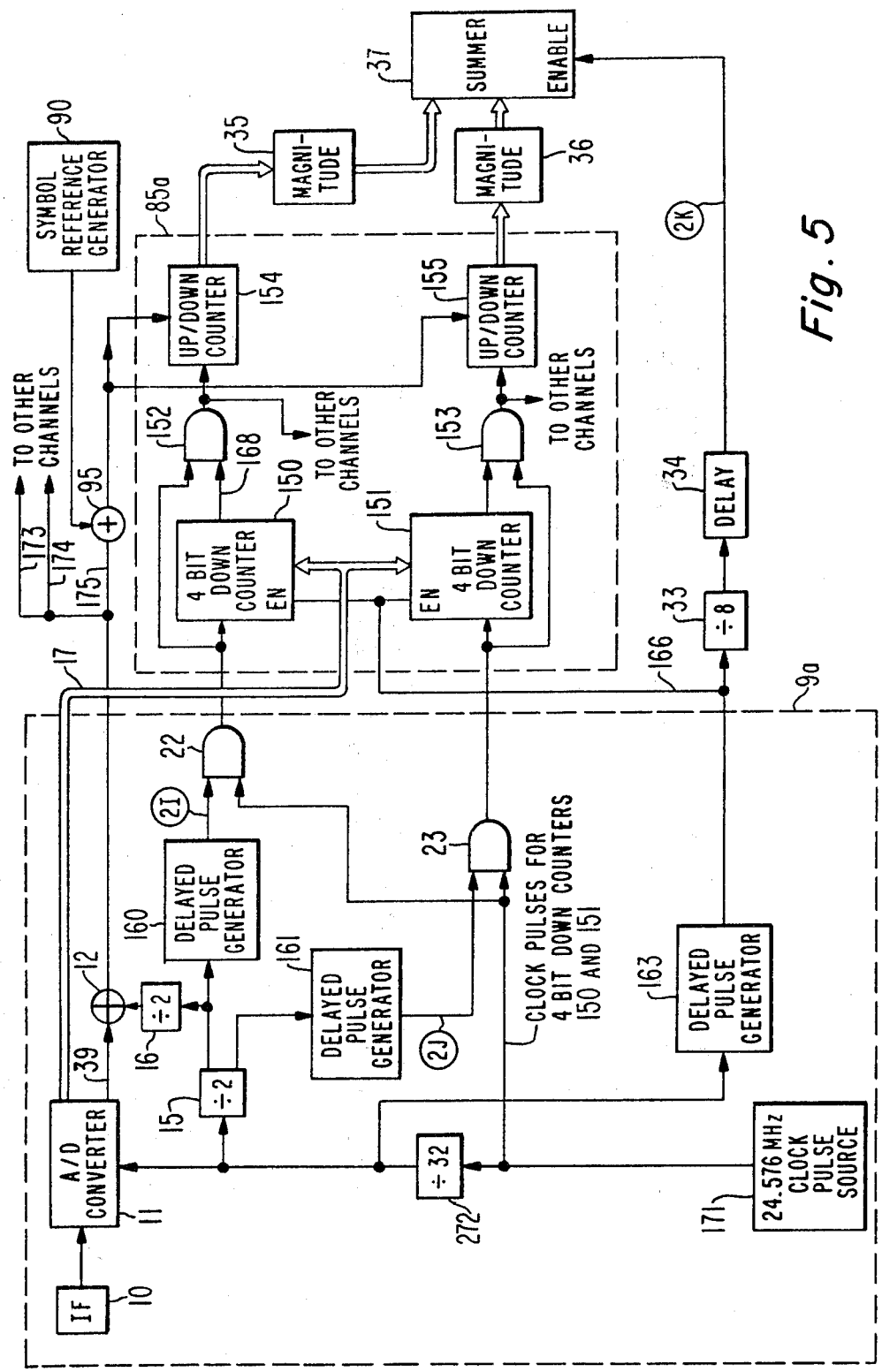
FIG. 5 is a block diagram of still another form of the invention.
Figure 6:
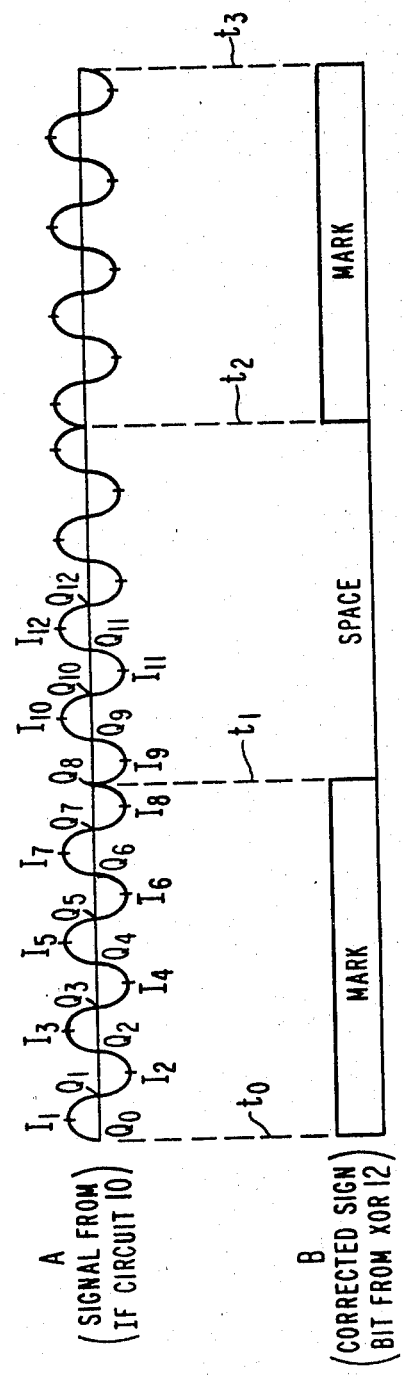
FIG. 6 is a set of waveforms to facilitate an understanding of the block diagram of FIG. 3.

Referring now to FIG. 3 there is shown a modification of the circuit of FIG. 1. Corresponding elements of FIGS. 1 and 3, as well as FIGS. 4 and 5, are identified by the same reference character. Further, the components, and the interconnections therebetween, included within the large dotted blocks 9 and 30 of FIGS. 1 and 3 are substantially the same and operate in the same manner and will not be described again re FIG. 3. The only exceptions are in the dashed blocks 30 of FIGS. 1 and 3 and involve the outputs of the two accumulators 42 and 43. Specifically, in FIG. 3 the only output of accumulator 42 which is utilized is the sign bit thereof and in the case of accumulator 43 of FIG. 3 the sign bit and the magnitude signals are separate and appear at the output of accumulator 43 on lead 72 and bus 74, respectively.

The principal difference in the logic of FIG. 3 from that of FIG. 1 is that in FIG. 3 the contents of the two accumulators 42 and 43 are employed to generate a phase error signal by means of multiplier 73, digital filter 76, and D/A converter 77 to produce a phase error signal which is supplied back to the 6.144 MHz clock source 13 via lead 80, the function of said error signal being to change the phase of clock source 13 so that the Q samplings have a zero magnitude, thereby phase synchronizing the I sampling times with the maximum amplitudes of the output waveform 2A from IF stage 10.

The foregoing is accomplished as follows. The sign bit of the accumulated contents of accumulator 42, after a predetermined number of samplings, is multiplied in multiplier 73 by the sign bit of the contents of the Q accumulator 43, after the same number of samplings, to produce a resultant sign bit on lead 75 which determines the gross phase relationship between the sampling pulses and the phase of the output waveform 2A or IF amplifier 10. By gross phase relationship is meant the leading or lagging phase relationship. The magnitude of such leading or lagging phase relationship between the sampling time and the waveform 2A is indicated by the magnitude of the Q accumulator output which appears on the magnitude output bus 74 of accumulator 43.

In the example shown in the waveforms of FIG. 2 the polarity of the Q accumulations is negative and the polarity of the I accumulations is positive. The product of the two sign bits of the I and Q magnitudes is therefore a negative value which, after being processed through the digital filter 76 and the A/D converter 77 of FIG. 3, function to advance or delay the samplings so that the Q1 sampling, for example, occurs precisely at time $t_3$ when waveform 2A passes through zero. The I samplings will then occur at the maximum amplitudes of waveform 2A.

Should the Q samplings occur before the I samplings in each of the half cycles of waveform 2A, with the relationship of the output of divider 16 with respect to waveform 2A being shown in FIG. 2, then the polarity of both the Q and the I samplings will be positive so that the product of the sign bit thereof in multiplier 73 of FIG. 3 will also be positive, thus causing the samplings to be advanced so that the $Q_1$ sampling will now occur at time $t_0$ and all of the I samplings will again occur at the maximum value of the half cycles of waveform 2A.

The system of FIG. 3 can be employed to demodulate an IF signal which is modulated by a two level signal consisting of marks and spaces. Such a modulated signal is depicted by waveform 6A which shows a mark being received between times $t_0$ and $t_1$ and also between time $t_2$ and $t_3$ and with a space being received between times $t_1$ and $t_2$. This signal is sampled at the times shown in waveform 2A after syncronization of the sampling pulses with the phase of the received signal has been obtained, that is, synchronization of the Q samples with the zero crossovers of waveform 6A.

The corrected sign bit output from XOR gate 12 (FIG. 3) the reproduces the original marks and spaces. More specifically, between times $t_0$ and $t_1$ the output of XOR gate 12 will be assumed to be a positive value with the phase of waveform 6A being shown between times $t_0$ and $t_1$. At time $t_1$, the phase of waveform 6A reverses so that the corrected sign bit from XOR gate 12 of FIG. 3 will also reverse, that is, become a low level signal as shown in waveform 6B between times $t_1$ and $t_2$. Next, at time $t_2$ when the phase of waveform 6A again reverses to its original state the output of the corrected sign bit of XOR gate 12 (FIG. 3) will change back to its high level, indicating a mark output on data output lead 70.

The system of FIG. 4 is an extension of the system of FIG. 1 to a plurality of received frequency signals. More specifically, the signal can consist of 64 different pseudo random sequences (PRS) each having the same time period, each representing a different character, and being transmitted in a time synchronous manner. The receiver must be capable of first generating timing pulses synchronized with the periods of the received PRS signals and then identifying which of the possible received PRS signals is the one actually being received.

The foregoing is accomplished by the logic system of FIG. 4 which consists ofa plurality of channels each comprising a pair of accumulators 42 and 43, a symbol reference generator 90, an XOR gate 95, magnitude logic means 35 and 36, and a summer means 102.

Additional channels included in FIG. 4 are represented by pairs of accumulators 83 and 84 and also accumulators 86 and 87 which correspond to the two accumulators 42 and 43 within dashed block 85. Additional components of the other channels in FIG. 4 are symbol reference generators 88, 89, 91, and 92 XOR gates 93, 94, 97, and 98, magnitude logic means 110, 111, 113, and 114, and summer means 100, 101, 103, and 104.

In FIG. 4 logic elements corresponding to similar logic elements in FIGS. 1 and 3 are identified by the same reference character. Also, the logic within dashed block 9 of FIG. 4 functions the same as the logic within dashed block 9 of FIGS. 1 and 3, except that in FIG. 4 a block 8 entitled "Receiver And Means For Synchronizing Periods" 8 has been added for synchronizing the periods of the received PRS signals with the periods of locally generated PRS signals in the symbol reference generators 88 through 92.

The output of the XOR gate 12 of FIG. 4, identified as the corrected sign bit, is in fact the demodulated received PRS signal for the same reasons as discussed in connection with the demodulation of the mark space signal received by the logic of FIG. 3. More specifically, as discussed re FIG. 3, once the phase of the samplings have been syncronized with the phase of the received carrier or IF signal, the I samplings will occur at the maximum values of the received carrier of IF signal such as waveform 2A. The polarity of such I signals will remain the same as long as the phase of waveform 2A remains the same. However, when the phase of waveform 2A shifts 180° (inverts) then the corrected sign bit outputted from XOR gate 12 will also be inverted. It can be seen that the polarity (level) of the corrected sign bit follows the level of the received two level PRS signal.

Such demodulation PRS signal outputted from XOR gate 12 is supplied to all of the XOR gates 93 through 97 of all channels in parallel manner but will only be coincident with one of the locally generated PRS signals. Assume that the locally generated PRS signal which coincides with the received PRS signal is generated in reference generator 90. The XOR gate 95 will respond to the two identical PRS signal supplied thereto to supply a d.c. voltage to the I and Q accumulators 42 and 43. Since the Q samplings are all of zero magnitude only, the I accumulator 42 will accumulate a magnitude. Under noiseless conditions the polarity of such magnitude will be the same throughout the reception of the received PRS signal since there is coincidence between such received PRS signal and the locally generated PRS signal.

The absolute magnitudes of the I accumulator 42 and the Q accumulator 43 are determined by magnitude logic means 35 and 36 and then supplied to summer 102 when such summer is enabled by a suitable clock pulse supplied thereto from delay means 34 in a manner discussed re FIG. 3. Because the magnitudes of the I and Q samplings are summed together the possibility that the samplings might not be in phase with the received carrier or IF signal (waveform 2A) is not important. It is only the total energy received by the accumulators 42 and 43 that is a measure of the coincidence of the received PRS signal and the locally generated PRS signal. Since the received PRS signal is not coincident with the locally generated PRS signals of any of the other channels, the output signals of the A/D converter in the I and Q accumulators of said other channels will be considerably less than the accumulation in accumulators 42 and 43 and would be expected to be near zero value.

Thus, summer 102 will be the only summer of summers 100 through 104 which will have a significant value supplied thereto from the associated accumulators 42 and 43. A suitable comparator means 105 functions to compare the contents of each of the summers 100-104 at a given time, as for example upon the occurrence of a clock pulse from delay means 34, to determine which of the summers contains the largest value. The identification of such summer will also identify the specific PRS signal received.

Referring now to FIG. 5 there is shown another form of the invention wherein 4 bit down counters 150 and 151, AND gates 152 and 153, and up-down counters 154 and 155 are substituted for the accumulators 42 and 43 within the dotted block 85 of FIG. 4.

It is to be understood that the various counters and AND gates within dotted block 85a of FIG. 5 can also be substituted for the accumulators 42 and 43 of FIGS. 1 and 3.

The logic within the dashed block 9a of FIG. 5 is almost exactly the same as the logic within dashed block 9 of FIG. 4 except that the clock pulses supplied through AND gates 22 and 23 to the logic within dotted block 9a comes directly from the output of 24.576 MHz clock pulse source 171 rather than from the output of divide-by-8 divider 14, as is the case in FIGS. 1, 3, and 4. The 24.576 MHz source is reduced to a 768 KHz signal by divider 272.

As in the case of the accumulators 42 and 43 of FIG. 1, the two 4 bit down counters 150 and 151 are alternately enabled as a result the two gates 22 and 23 being alternately enabled.

However, due to a difference in operation between the circuit of FIG. 5 and that of FIG. 1, namely the use of counters with the block in lieu of accumulators, the AND gates 22 and 23 will only be enabled for a portion of the half cycle of the output of divider 15. Specifically, AND gate 22 will be primed during the pulses shown in waveform 21 and AND gate 23 will be enabled during the alternate pulses of waveform 2J, which can be seen to be interleaved with the pulses of waveform 2I. The pulses of waveforms 2I and 2J are generated, respectively, by means of delay pulses generators 160 and 161 which respond to the two outputs of divider 15 to produce such delayed pulses of waveforms 2I and 2J.

The use of the delayed pulses of waveforms 2I and 2J is necessary to allow time for the magnitude output of A/D converter 11 to be alternately supplied to the two 4 bit counters 150 and 151 via bus 17 before the count down clock pulses from source 13 are supplied to the two 4-bit down counters 150 and 151.

Further, as will be seen later, herein, it is necessary that the magnitude values supplied to the 4-bit down counters 150 and 151 be transferred serially to up/down counters 154 and 155 before the next output pulse from delayed pulse generators 160 and 161 occurs. It is also necessary to read the contents of up/down counters 154 and 155 at periodic intervals into the summer 37 during a time period when the up/down counter 154 and 155 are not receiving a magnitude value from the 4 bit down counters 150 and 151.

The general operation of the circuit of FIG. 5 is as follows. A magnitude value is read into one of the two 4-bit down counters 150 or 151. Assume that such magnitude value is read into 4 bit counter 150 by means of a clock pulse, such as those shown in waveform 2G. It is to be understood that such clock pulse is generated by the delayed pulse generator 163 of FIG. 5 and is supplied to the enabling inputs of the 4 bit down counter 150 via lead 166. Subsequently, by an enabling pulse, such as pulse 167 of waveform 2I, the AND gate 22 is enabled to permit the clock pulses from source 171 to pass therethrough and cause the counter 150 to count down to zero from the value that had been entered therein by the magnitude signal outputted from A/D converter 11. The output lead 168 of 4 bit down counter 150 will have a binary 1 thereon until the count of 4 bit counter 150 counts down to zero. Accordingly, AND gate 152 will pass that number of pulses from source 171 to 4 bit down counter 150 which are required to cause said down counter 150 to count to zero. Thus, a stream of pulses equal to the magnitude of the signal supplied to down counter 150 from A/D converter 11 will be supplied to up-down counter 154 during the pulse 167 of waveform 2I. During the next I sampling another value of magnitude will be entered into up-down counter 154 in the same manner as discussed above so that up-down counter 154 will accumulate a count representing the sum of the magnitudes of the I samplings.

In a similar manner the 4 bit down-counter 151, the AND gate 153, and the up-down counter 155 will operate so that up-down counter 55 will accumulate the magnitude values of the Q samplings.

At predetermined intervals of time the accumulated values in the up-down counters 154 and 155 will be read therefrom through magnitude logic means 35 and 36 to summer 37 under control of enabling pulses 180 and 181 which are generated by means of divide-by-8 logic 133 and delay means 34 so that they occur every 8 samplings and are delayed by a time interval such that they occur immediately after one of the AND gate enabling pulses, as shown in waveform 2J. The symbol reference generator 90 and the XOR gate 95 of FIG. 4 correspond to the symbol reference generator 90 and XOR gate 95 of FIG. 4. The leads 173 and 174 indicate other channels in the system and are connected to XOR gates corresponding to XOR gate 95.

The outputs of the two AND gates 152 and 153 will also go to each of two up/down counters in the other channels in the system. Clock source 171 has a higher frequency than clock source 13 of FIG. 4 because a higher clock rate is required to cause the 4 bit down counters 150 and 151 to count down to zero from a possible maximum value of 15 in the time permitted between the entry of a magnitude value into one of the count-down counters 150 or 151 and a subsequent magnitude being entered into the other count-down counter.

What is claimed is:

1. A system for digital detection of the energy content of a received analog signal of frequency $f_c$ and comprising:
    sampling means including sampling signals for obtaining digitized samplings of said analog signal at sampling rate $4 f_c$ with successive samplings being defined alternately as I and Q samplings and spaced apart 90° relative to the phase of said received analog signal, and with each of said digitized samplings having a magnitude component and a sign component;
    first means responsive to said sampling means to produce first and second quadrature two level timing control signals each having a frequency $2 f_c$ with the level transitions of said first quadrature signal occurring at each sampling signal, to produce a two level polarity control signal of frequency $f_c$ with the transitions occurring at every alternate sampling, and to produce clock pulses having a repetition rate $4 f_c$ and occurring between the level transitions defining each half cycle of one of said two level timing control signals;
    multiplier means responsive to said sign component of said digitized samplings and said two level polarity control signal to produce a corrected sign bit signal;
    and
    first logic means comprising first and second accumulator means for accumulating, when enabled, the magnitude components of said I and Q samplings, respectively, in accordance with the polarity of the said corrected sign bit signal of each of said samplings; and
    second logic means for enabling said first and second accumulator means upon the concurrence of a given level of said first and second two level timing control signals, respectively, and a clock pulse.

2. A system as in claim 1 and further comprising means responsive to said clock pulses to combine the magnitudes of the accumulations of said first and second accumulator means at predetermined time intervals.

3. A system as in claim 1 and further comprising:
    means for multiplying together the cumulative sign component of the accumulations in said first and second accumulator means to produce a resultant sign signal;
    means responsive to the absoluted magnitude of the accumulations in a selected one of said accumulators and to said resultant sign signal to produce a phase error indicating signal;
    said sampling means responsive to said phase error indicating signal to shift the phase of said digitized sampling with respect to the phase of said received analog signal in a direction to decrease the accumulation in said selected accumulator towards zero.

4. A system for digitally detecting the energy content of a received analog signal of frequency $f_c$ and comprising:
    signal generating means for generating sampling pulses of repetition rate $4 f_c$, a first two level signal of frequency $2 f_c$ whose successive level transitions occur near successive sampling pulses, a second two level signal whose successive level transitions occur near successive level transitions of a first polarity of said first two level signal, and first and second interleaved trains of pulses each having a repetition rate 2 $f_c$ and with each pulse of each train of pulses occurring between the level transitions of successive half cycles of said first two level signal;

second means responsive to said sampling pulses to obtain alternate I and Q samplings of said analog signal with each sampling comprising a magnitude component and a sign component;

means for multiplying said sign component by said second two level signal to produce a corrected sign signal; and first and second storage means each responsive to said corrected sign signal and to the concurrent occurrence, respectively, of said first and second interleaved trains of pulses to store, respectively, the concurrent I and Q samplings each with a sign bit indicating a polarity in accordance with said corrected sign signal.

5. A system as in claim 4 and further comprising:
means for delaying said sampling pulses; and
means responsive to said delayed sampling pulses to combine the magnitudes of the accumulations of said first and second storage means at predetermined time intervals.

6. A system as in claim 4 and further comprising:
means for multiplying together the stored sign bits of the samplings in said first and second storage means to produce a resultant sign signal;
means responsive to the absolute magnitude of the accumulations in a selected one of said storage means and to said resultant sign signal to produce a phase error indicating signal;
said signal generating means responsive to said phase error indicating signal to shift the phase of said sampling pulses with respect to the phase of said received analog signal to decrease the stored samplings in said selected storage means towards zero.

7. A method for digitally detecting the energy content of a received analog signal of frequency $f_c$ and comprising the steps of:
obtaining digitized samplings of said analog signal at a sampling rate 4 $f_c$ with successive samplings being defined alternately as I and Q samplings and spaced apart 90° relative to the phase of said received analog signal, and with each of said digitized samplings having a magnitude component representing the magnitude of the sampling and a sign component representing the polarity of the sampling;
producing a two level polarity control signal having a frequency $f_c$;
producing first and second quadrature two level timing control signals each having a frequency 2 $f_c$ with the level transitions of one polarity thereof occurring at successive level transitions of said two-level polarity control signal;
producing clock pulses having a repetition rate 4 $f_c$ and occurring between the level transitions defining each half cycle of one of said two level timing control signals;
multiplying the sign component of said digitized samplings by said two level polarity control signal to produce a corrected sign signal; and
separately accumulating the magnitude components of said I and Q samplings, respectively, and with a sign bit in accordance with the polarity of said corrected sign signal of each of said samplings.

8. A method as in claim 7 and comprising the further step of:
combining the absolute magnitudes of the accumulations of said I and Q samplings at predetermined time intervals.

9. A method as in claim 7 and comprising the further steps of:
multiplying together the sign bits of the accumulated magnitude components of said I and Q samplings to produce a resultant sign bit;
producing a phase error indicating correction signal in proportion to the absolute magnitude of the accumulation of a selected one of said I or Q samplings and in accordance with said resultant sign bit; and
shifting the phase of said digitized samplings in accordance with said phase error indicating signal to decrease the accumulation of said selected samplings towards zero.

10. A method for digitally detecting the energy content of a received analog signal of frequency $f_c$ comprising the steps of:
generating sampling pulses of repetition rate 4 $f_c$;
generating a first two level signal of frequency 2 $f_c$ whose successive level transitions occur near successive sampling pulses;
generating a second two level signal whose successive level transitions occur near successive level transitions of a first polarity of said first two level signal;
sampling said received analog signal at a sampling rate of 4 $f_c$ to obtain alternate I and Q samplings with each sampling comprising a magnitude component and a sign component;
multiplying said sign component signals by said second two level signal to produce a corrected sign component;
generating first and second interleaved trains of pulses each having a repetition rate 2 $f_c$ with each pulse occurring between the level transitions of successive half cycles of said second two level signal; and
accumulating, respectively, the magnitudes of said I and Q samplings with a sign bit in accordance with the corrected sign component.

11. A method as in claim 10 and comprising the further step of:
combining the absolute magnitudes of the accumulations of said I and Q samplings at predetermined time intervals.

12. A method as in claim 10 and comprising the further steps of:
multiplying together the sign bits of the accumulations of the magnitudes of said I and Q samplings to produce a resultant sign bit;
producing a phase error indicating signal derived from the absolute magnitude of the accumulation of a selected one of said I and Q samplings in accordance with said resultant sign bit; and
shifting the phase of said I and Q samplings in accordance with said phase error indicating signal to decrease the accumulation of said selected samplings towards zero.

* * * * *

UNITED STATES PATENT AND TRADEMARK OFFICE
CERTIFICATE OF CORRECTION

PATENT NO. : 4,412,302

DATED : October 25, 1983

INVENTOR(S) : Edward Joachim Nossen

It is certified that error appears in the above-identified patent and that said Letters Patent is hereby corrected as shown below:

Col. 5, line 51, "by 32 by 8" should be --32 by 8--.

Col. 6, line 57, "syncronization" should be --synchronization--.

Col. 6, line 62, "the reproduces" should be --then reproduces--.

Col. 7, line 17, "ofa plurality" should be -- of a plurality--.

Col. 7, line 45, "syncronized" should be --synchronized--.

Col. 11, line 29, delete "stored".

Col. 11, line 30, before "samplings" insert --stored--.

Signed and Sealed this

Thirty-first Day of January 1984

[SEAL]

Attest:

GERALD J. MOSSINGHOFF

Attesting Officer

Commissioner of Patents and Trademarks